US009113038B2

(12) United States Patent
McGowan et al.

(10) Patent No.: US 9,113,038 B2
(45) Date of Patent: Aug. 18, 2015

(54) DISTRIBUTED VIDEO MIXING

(75) Inventors: James W. McGowan, Whitehouse Station, NJ (US); Tom Janiszewski, Andover, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 971 days.

(21) Appl. No.: 13/278,773

(22) Filed: Oct. 21, 2011

(65) Prior Publication Data

US 2013/0100352 A1 Apr. 25, 2013

(51) Int. Cl.
*H04N 7/14* (2006.01)
*H04N 7/15* (2006.01)

(52) U.S. Cl.
CPC .................... *H04N 7/152* (2013.01)

(58) Field of Classification Search
CPC ........................................................ H04N 7/14
USPC ................ 348/14.01, 14.08, 14.09, 14.12
See application file for complete search history.

(56) References Cited

U.S. PATENT DOCUMENTS 8,659,636 B2 * 2/2014 Firestone et al. .......... 348/14.08
2005/0078170 A1 4/2005 Firestone et al.

OTHER PUBLICATIONS

B. Yu et al., "A Scalable Overlay Video Mixing Service Model," Proceedings of the Eleventh ACM International Conference on Multimedia (MM), Nov. 2003, pp. 646-647.
M. Radenkovic et al., "Multi-Party Distributed Audio Service with TCP Fairness," Proceedings of the Tenth ACM International Conference on Multimedia (MM), Dec. 2002, pp. 11-20, Juan-les-Pins, France.

* cited by examiner

*Primary Examiner* — Olisa Anwah
(74) *Attorney, Agent, or Firm* — Ryan, Mason & Lewis, LLP

(57) ABSTRACT

Techniques are disclosed for video mixing in a distributed computing environment. For example, a method comprises the following steps. At a first mixing device, one or more local video streams are received from one or more sources local to the first mixing device. The first mixing device generates a first partially-composited video stream, wherein the first partially-composited video stream comprises: (i) a partial set of video elements of the one or more local video streams; and (ii) information about video elements of the one or more local video streams. The first mixing device sends the first partially-composited video stream to at least a second mixing device remote from the first mixing device. The first mixing device and the second mixing device may be part of a video conferencing system.

20 Claims, 5 Drawing Sheets

DISTRIBUTED VIDEO MIXING

FIELD OF THE INVENTION

The present invention relates generally to video signal processing and, more particularly, to techniques for video mixing in a distributed computing environment.

BACKGROUND OF THE INVENTION

A video mixer is a processing device that receives video streams signals) from multiple different video sources and mixes the video streams to form a composite video stream. Mixing may also be referred to as "compositing." By way of example, video mixers are used in video conferencing systems. In such systems, the video mixer typically receives individual video streams from conference participants and generates a composite video stream by mixing (compositing, combining) the individual streams into one stream. The composite video stream is then sent back to the conference participants. Note that video mixers also typically mix audio associated with the video streams.

Thus, a video mixer may also be called a "multipoint control unit" (MCU) since the mixer receives the multiple video streams from the multiple conference participants, combines the multiple streams (via mixing/compositing) to produce the single composite stream, and sends the single composite stream back to each of the multiple participants. The composite stream enables each participant to view on one display screen the video images of the other participants, perhaps along with his or her own video images, in real time. The processing device used by each participant to participate in the video conference is typically called an endpoint.

In the video conferencing system scenario, since bandwidth and latency issues can be a problem, existing architectures typically mix video (and audio) at a single point (e.g., at the MCU), and export the mixes to all participants of the conference, as explained above.

SUMMARY OF THE INVENTION

Embodiments of the invention provide techniques for video mixing in a distributed computing environment.

For example, in one aspect of the invention, a method comprises the following steps. At a first mixing device, one or more local video streams are received from one or more sources local to the first mixing device. The first mixing device generates a first partially-composited video stream, wherein the first partially-composited video stream comprises: (i) a partial set of video elements of the one or more local video streams; and (ii) information about video elements of the one or more local video streams. The first mixing device sends the first partially-composited video stream to at least a second mixing device remote from the first mixing device.

The first mixing device may receive a second partially-composited video stream from one of the second mixing device and a third mixing device remote from the first mixing device, the second partially-composited video stream comprising: (i) a partial set of video elements of one or more local video streams received from one or more sources local to the one of the second mixing device and the third mixing device; and (ii) information about video elements of the one or more local video streams. Further, the first mixing device may use the first partially-composited video stream and the second partially-composited video stream to generate a fully-composited video stream, which the first mixing device sends to one or more destinations. The one or more destinations may be the one or more sources local to the first mixing device and/or another mixing device.

The partial set of video elements of the one or more local video streams may comprise a partial rendering of the one or more local video streams, and the information about the video elements of the one or more local video streams may comprise state information (e.g., metadata) about those video elements.

In another aspect of the invention, an apparatus with a processor and memory is configured to form a mixing device that performs one or more of the above steps.

In a further aspect of the invention, an article of manufacture comprises a computer readable storage medium and one or more computer executable instructions stored on the computer readable storage medium that, when executed by a computer, perform one or more of the above steps.

Advantageously, illustrative embodiments of the invention provide distributed mixing methodologies for use in a video conferencing system that improve bandwidth and reduce latency in the video conferencing system.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Illustrative embodiments of the invention will be described below in the context of video conferencing applications. However, it is to be understood that embodiments of the invention are not limited to video conferencing applications but are more generally applicable to any video processing application wherein it is desirable to distribute video compositing operations while addressing bandwidth and latency issues. Also, it is to be appreciated that while illustrative embodiments of the invention are described below in the context of video streams, other types of data (e.g., audio) may be mixed in the manners described herein.

Figure 1:
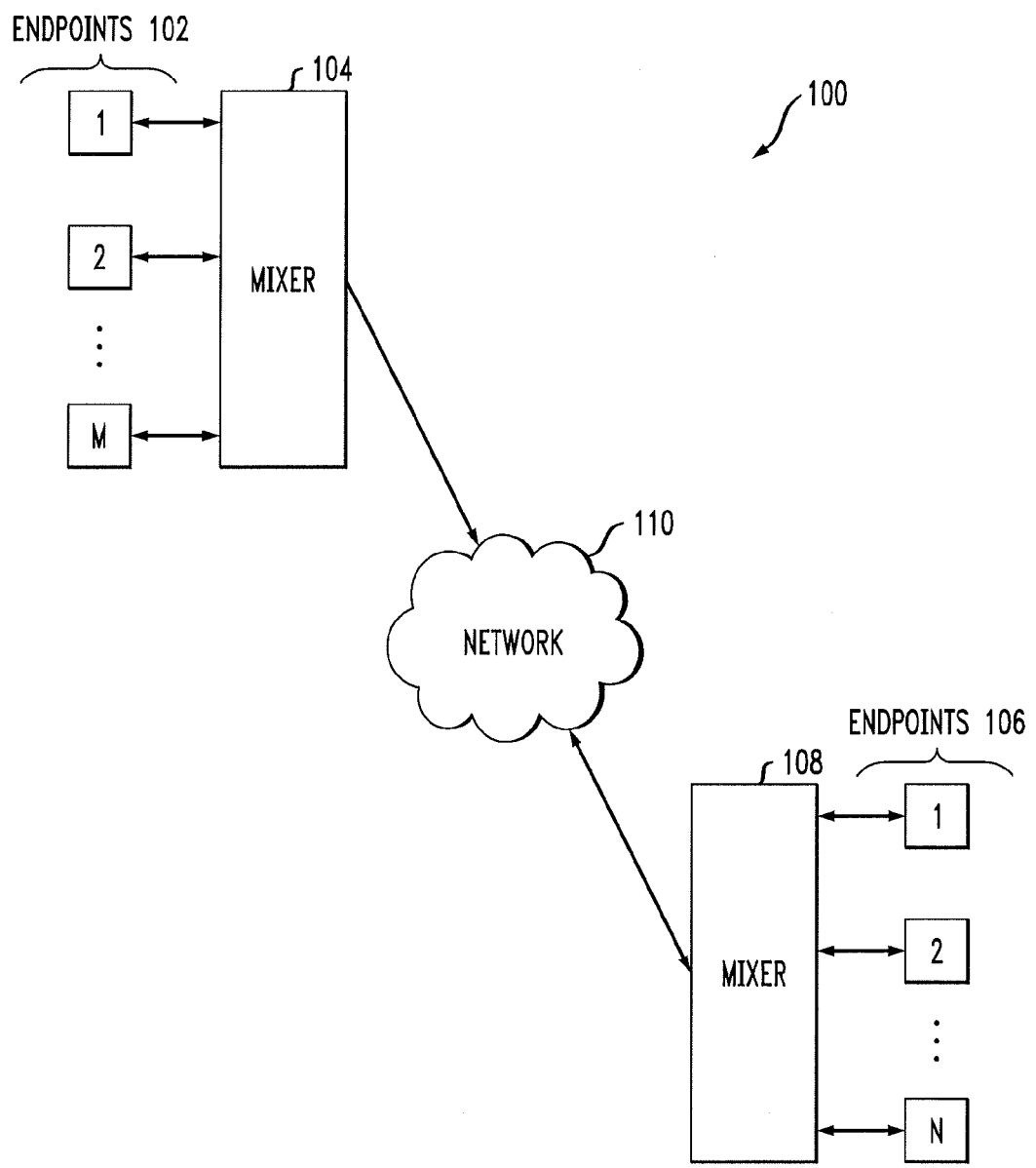
FIG. 1 illustrates a distributed video mixing system, according to an embodiment of the invention.

FIG. 1 illustrates a distributed video mixing system, according to an embodiment of the invention. As shown, video mixing system 100 comprises a plurality of endpoints 102-1, . . . , 102-M, which are coupled to a first video mixer (more generally, a mixing device or mixer) 104. The plurality of endpoints 102-1, . . . , 102-M are considered local sources with respect to video mixer 104. Similarly, a plurality of endpoints 106-1, . . . , 106-N are coupled to a second video mixer 108. The plurality of endpoints 106-1, . . . , 106-M are considered local sources with respect to video mixer 108.

Video mixer 104 and video mixer 108 are coupled to each other through a network 110. Video mixer 104 and video mixer 108 are considered remote from one another, e.g., at different, geographically-separated locations.

While system 100 is not limited, to operating in the context of a video conferencing application, it will be assumed that, for the purposes of this illustrative explanation, that system 100 is operating as a video conferencing system (or, at least, a part of a video conferencing system). As such, endpoints 102-1, ..., 102-M and 106-1, ..., 106-N are the client devices that are used by the video conference participants. Each endpoint includes, inter alia, a microphone, a video camera, an audio speaker, and a display screen for participating in the conference. Examples of such devices may include, but are not limited to, desktop computers, laptop computers, smartphones and tablets. The endpoints may be coupled to their respective video mixer via any suitable connection. This could be via a local area network, or some other wired or wireless connection. Furthermore, video mixer 104 and video mixer 108 are coupled over network 110 which may be, by way of example only, the Internet or an intranet. This may include both wireless and/or wired connections.

It is to be understood that while only two mixers are shown in FIG. 1, embodiments of the invention are not limited thereto. That is, more than two mixers may be employed in the distributed video mixing system 100 (e.g., a third video mixer, ..., nth video mixer). Also, while each mixer is shown as having a plurality of endpoints associated therewith, it is to be appreciated that any one mixer could have only one endpoint associated therewith. Also, one or more endpoints could be coupled to a mixer via the network 110 rather than through a separate connection medium. Note also that the term "mixer" and phrase "partial mixer" are used interchangeably herein, since a partial mixer is a mixer or mixing device that generates a partially-composited video stream as will be explained herein.

Advantageously, embodiments of the invention provide for a "global" mixing of video streams across a distributed architecture such as is shown in FIG. 1 by "local" piece-wise mixing at each mixer, as will be further explained below. That is, each endpoint in the system receives a video stream that is generated in conjunction (cooperation) with two or more mixers of the system. As will be explained in more detail below, the internal state(s) of a mixer algorithm (methodology executed by a mixer to perform compositing operations) and a single, partially-composited image can be sent between mixers. Upon receipt of these, a local mixer can complete the compositing operations.

By way of example, and with reference to the components of FIG. 1, a distributed video mixing methodology (compositing operations) may be performed as follows.

Video mixer 104 receives respective video streams from the (local) endpoints 102-1, ..., 102-M. Each local video stream (signal) is a video of the corresponding conference participant captured by the video camera and microphone of the corresponding endpoint. It is to be understood that a "video" may comprise one or more "images." Audio can also be part of a video.

The video mixer 104 then generates a first partially-composited video stream. As mentioned above, a compositing operation generally involves combining multiple video streams into a single composite video stream enabling each participant to view on one display screen the video images of other participants. While this is an end result of the compositing operations of system 100, the compositing operations in system 100 are distributed such that two or more mixers perform partial compositing operations and generate partially-composited video streams that, when ultimately used to form a (final) globally-composited video stream, result in each participant being able to view on one display screen the video images of other participants perhaps also along with his or her own video images) in real time.

It is to be understood that the final composited video stream that is provided to each endpoint may or may not include all participants in the video conference. That is, assuming that the video conference is relatively large, e.g., ten or more participants, it can become difficult and, in many cases, unnecessary for each participant to view a composite video that includes all other participants. The typical participant viewing the composite video stream can only process so much visual information on a screen at one time and, furthermore, some participants may not be contributing to the conference or may have stepped away from their client (endpoint) device such that inclusion of their video stream becomes unnecessary. Thus, it may be desirable only to include certain key participants in the final composite video stream that is sent to each endpoint. The decision as to which participants are to be included in the final composite video stream can be made by the distributed mixers, e.g., video mixer 104 and video mixer 108, either alone or in concert with one another.

Thus, in accordance with embodiments of the invention, the first partially-composited video stream generated by video mixer 104 comprises a partial set of video images (elements) of the local video streams, i.e., a subset of the video streams received from the endpoints 102-1, ..., 102-M. Thus, in one example, the first partially-composited video stream may include a video stream from only endpoint 102-1 but not video streams from endpoints 102-2 through 102-M. However, the first partially-composited video stream also advantageously comprises information (e.g., metadata) about all the video streams received from all endpoints 102-1, ..., 102-M locally associated with video mixer 104. This metadata is data about each of the video streams, e.g., state information, as will be explained in further detail below. Note that the data that makes up a partially-composited video stream signal (i.e., the partial set of video images and the metadata for all streams) can be combined and transmitted in any appropriate conventional manner.

The video mixer 104 sends the first partially-composited video stream to the video mixer 108. Note that video mixer 108 has (or is in the process of or begins the process of) generating a second partially-composited video stream. The second partially-composited video stream comprises a partial set of video images (elements) of the local video streams, i.e., a subset of the video streams received, from the endpoints 106-1, ..., 106-N. Thus, in one example, the second partially-composited video stream may include a video stream from endpoint 106-1 and a video stream from endpoint 106-2 but not video streams from endpoints 106-3 through 106-N. However, the second partially-composited video stream also advantageously comprises information (e.g., metadata) about all the video streams received from all the endpoints 106-1, ..., 106-N. Video mixer 108 sends the second partially-composited video stream to video mixer 104.

It is to be appreciated that each video mixer (104 and 108) can use all or portions of the metadata it receives from the other mixer to make a decision as to which video streams to include in the compositing operations it performs. That is, by way of example only, state information from mixer 104 received by mixer 108 may cause mixer 108 to determine that the participant on endpoint 106-3 should be included in the second partially-composited video stream rather than some other participant, and thus mixer 108 will include the video stream from endpoint 106-3 in the partially-composited stream it sends hack to mixer 104. Examples of state information that may be sent and used in a decision include, but are not limited to, data indicative of the presence of speech in a given video element, data indicative of an instance of face cropping in a given video element, and data indicative of a contribution to an average sound level in a given video element.

Each of the video mixers 104 and 108 can then perform a final compositing operation based on the first partially-composited video stream and the second partially-composited video stream to generate a fully-composited video stream. Note that the term "fully" may not always mean that all video streams from all endpoints in the video conference are included in the final video stream sent to each endpoint. That is, the term "fully" means here that the video stream sent to each endpoint is based on collaborative compositing operations performed by two or more distributed video mixers, as explained above, whether or not it ultimately includes video images of all conference participants.

Figure 2:
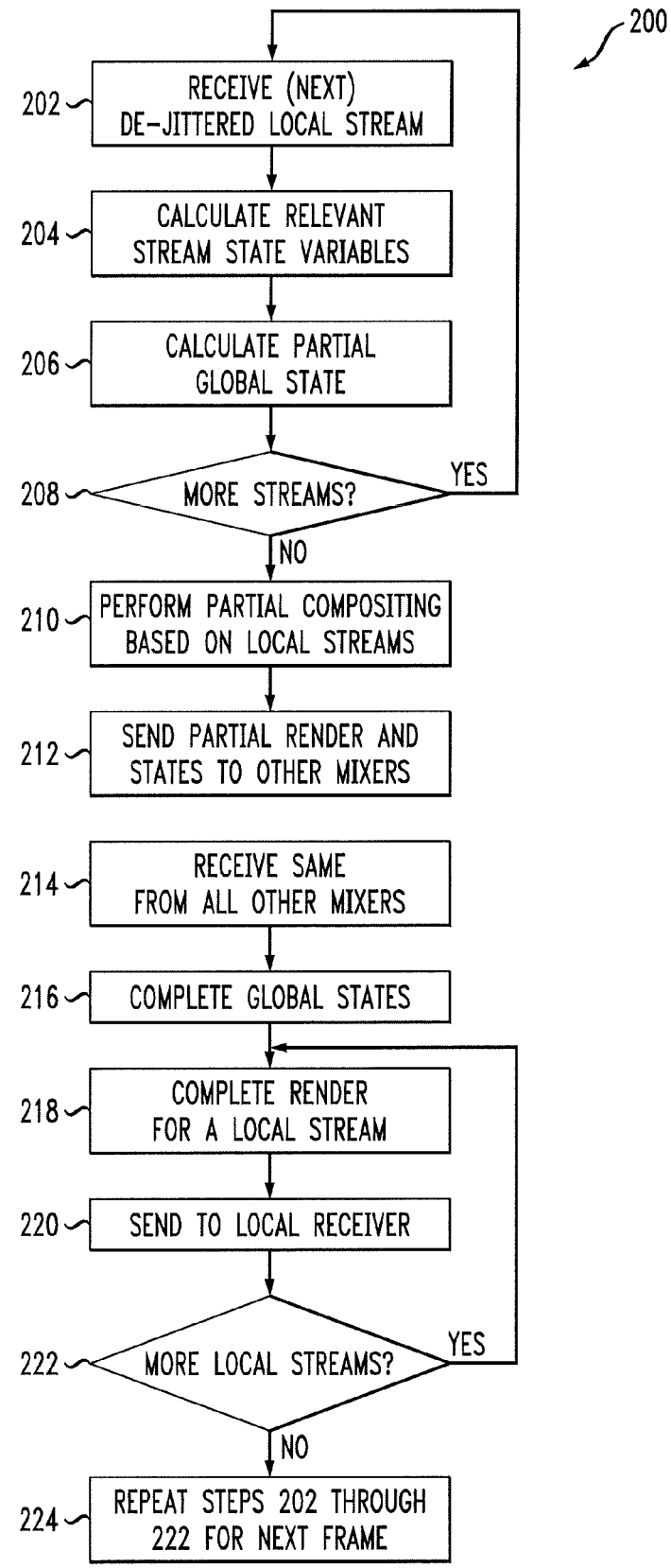
FIG. 2 illustrates a distributed video mixing methodology, according to an embodiment of the invention.

FIG. 2 illustrates a distributed video mixing methodology, according to an embodiment of the invention. It is to be understood that the methodology 200 may be performed in video mixer 104, video mixer 108, or any other video mixer (not expressly shown) in system 100. Note also that the methodology 200 depicts processing on a single video frame. Thus, the process is repeated for each video frame.

In step 202, the video mixer receives a local video stream, i.e., one of the streams from the local endpoints associated with that mixer. The received video stream is preferably a de-jittered video stream (i.e., signal jitter reduced or removed).

In step 204, the video mixer calculates one or more relevant stream state variables (states or state information) from the received local video stream. One of ordinary skill in the art will understand how such stream state variables are calculated. Examples of "local" state information or state information calculated from local streams include, but are not limited to, a flag indicating the presence of speech or a face cropping of the video.

In step 206, the video mixer calculates one or more partial global states. One example of such a partial global state is a local stream's contribution to an average sound level of all streams which can be computed without the other streams, provided the overall stream count is known and shared, which can be considered as another global state. Embodiments of the invention are not limited to these examples.

In step 208, the video mixer checks whether or not there are more local streams to consider and process. If so, the methodology loops back to step 202 and repeats steps 204 through 208 until all local streams have been considered and processed.

In step 210, assuming all local streams have been considered and processed, the video mixer performs partial compositing based on the received local streams. For example, this is where the video mixer generates the first partially-composited video stream described above containing a subset of the received local streams (a partial render) and state information (states) for all received local streams.

In step 212, the video mixer sends the first partially-composited video stream to all other mixers participating in the distributed mixer-based video conference. In one embodiment, the partially-composited video stream provides a partial representation, when displayed, of the conference participants whose video streams have been included in the stream. This may be in the form of a sequence or other arrangement (n×n matrix or other geometric layout) of small boxes with each box containing a video of one of the participants. In another embodiment, this may be in the form of a virtual (computer-generated) image of a conference table where participants whose video streams are included are shown as being seated at the conference table while those not included are depicted as empty seats. The participants may be depicted as CGI likenesses of the participants, or the video images of the participants may be superimposed into the CGI conference table environment. One of ordinary skill in the art will appreciate how these partial rendering can be accomplished.

In step 214, the video mixer receives similar partially-composited video streams from all other mixers participating in the distributed mixer-based video conference. That is, the video mixer receives the second partially-composited video stream which, as described above, is the partially-composited video stream generated by another video mixer that contains a subset of the local streams (a partial render) received by that other video mixer and state information (states) for all such local streams. The second partially-composited video stream may be rendered in one of the above described ways.

In step 216, having received state information from all other mixers participating in the distributed mixer-based video conference, the video mixer completes all global states. Again, one example may be a final calculation of an average sound level given each participating endpoint's contribution thereto. Furthermore, any decision making algorithms in the mixer can use its own local states and those local states received from remote mixers to draw whatever conclusions are to be computed.

In step 218, the video mixer completes the rendering for a given one of its local endpoints. This local stream, referred to above as a fully-composited video stream, includes whichever video streams have been included based on the collaborative compositing operations performed by the mixers of the distributed system.

It should be noted that mixers can compute a different output stream for different participants. In one example, a participant receives a mix of other participants except him/herself, which is an "N choose N−1 mixer." Another mixer may use "N choose k" algorithms, which chooses k<<N streams for mixing. In that case, there are k+1 unique streams, and those are sent as appropriate. i.e., everyone in the k selected streams receives all k participants except themselves, everyone not in k receives all k mixed. Embodiments of the invention may be applied in a straightforward manner to such mixers.

In step 220, the video mixer sends the folly-composited video stream to the corresponding local endpoint (receiver).

In step 222, the video mixer checks whether or not there are more local endpoints and, if so, steps 218 and 220 are repeated for each local endpoint.

When the video mixer sends out all of the local streams, the methodology ends for the given video frame being processed. Then, as indicated in block 224, steps 202 through 222 are repeated for the next frame.

It is to be appreciated that each video mixer participating in the distributed mixer-based video conference performs methodology 200 such that each participant in the conference receives an appropriate composite video stream and can meaningfully participate in the conference.

Figure 3:
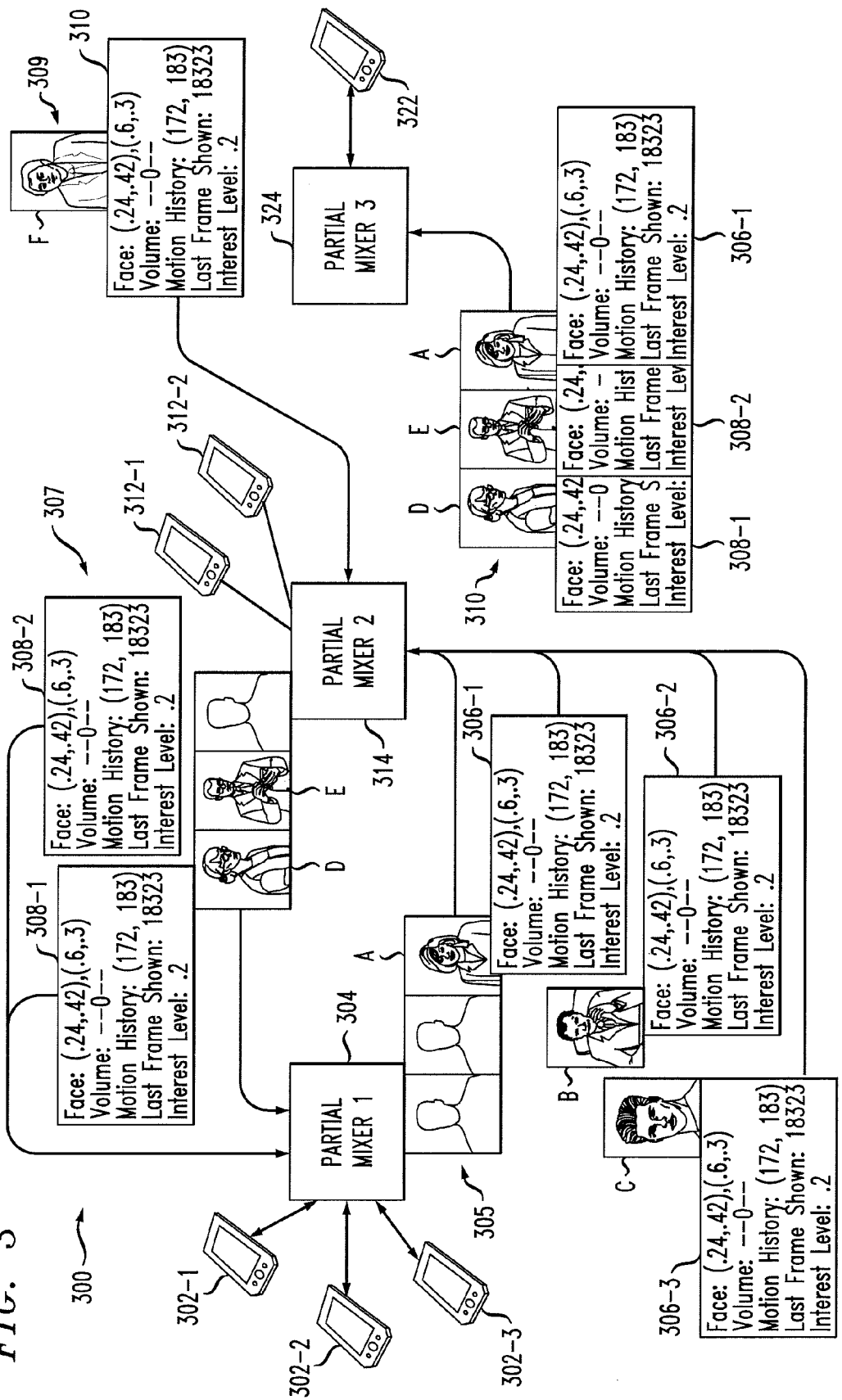
FIG. 3 illustrates a video conferencing application of a distributed video mixing system, according to an embodiment of the invention.

FIG. 3 illustrates a video conferencing application 300 of a distributed video mixing system, according to an embodiment of the invention. More particularly, FIG. 3 illustrates a distributed video mixing system with three video mixers 304, 314 and 324 (referred to as "partial mixers" since they generate partially-composited video streams as described above). Two separate conference scenarios will be described in the context of FIG. 3, one involving partial mixer 304 and partial mixer 314 only, and another involving partial mixer 304 partial mixer 314 and partial mixer 324.

As shown, partial mixer 304 has three local endpoints 302-1, 302-2 and 302-3, while partial mixer 314 has two local endpoints 312-1 and 312-2, and partial mixer 324 has one endpoint 322. Note that the participants that are using the endpoints are denoted by letters in FIG. 3. So, assume the following participant to endpoint correspondence: participant A—endpoint 302-1; participant B—endpoint 302-2; participant C—endpoint 302-3; participant D—endpoint 312-1; participant E—endpoint 312-2; and participant F—endpoint 324.

In a first scenario (between partial mixers 302 and 314 only), it is assumed that partial mixer 302 generates partially-composited video stream which includes a partial set of video images 305 (illustrated as a sequential rendering) and state information 306-1, 306-2 and 306-3. Here each set of state information includes data relating to the corresponding participants' face, volume, motion, last frame shown, and interest level. These states (metadata) are calculated by mixer 304 based on local video streams received from its local endpoints 302-1, 302-2 and 302-3. The specific states that are shown in the figure are for illustration purposes only. Any other desired state information can be calculated and sent by the partial mixer.

Note that only the video stream associated with participant A is included in the partial set of video images 305 of the composite stream but metadata for all three participants local to mixer 304, i.e., participant A, B and C, is included with the composite stream. In the example rendering in FIG. 3 of the partial set of video elements 305, note that each of the other two participants B and C are merely represented as a blank outline of a person (another rendering could include the virtual conference table example described above where a non-included participant is denoted by an empty seat, or the rendering could be just a partial screen with the non-included participants absent from the rendering). Also note that while video images of participants B and C are shown in FIG. 3 next to their state information 306-2 and 306-3, this is only to show correspondence between the state information, participant and endpoint. These video images are not sent to partial mixer 314 in this particular scenario.

The partially-composited video stream generated by partial mixer 304 is sent to partial mixer 314. Partial mixer 314 generates a partially-composited video stream which includes a partial set of video images 307 (illustrated as a sequential rendering) and state information 308-1 and 308-2.

Note here that the video streams associated with participants D and E are included in the partial set of video images 307 of the composite stream as well as metadata for both these participants local to mixer 314. The partial set of video images 307 also depicts a blank outline but this is merely to illustrate that metadata from some other endpoint (local or otherwise) could be included in the information sent from partial mixer 314 to partial mixer 304. For example, part of the metadata for a conference participant is their position in the composite, either by coordinates e.g., the upper-left pixel of a bounding box) or as a cardinal position ("slot 1," "slot 2," etc.). It is to be appreciated that there are many alternative implementations one could employ, and which one is most appropriate depends on the given implementation and use details.

The partially-composited video stream generated by partial mixer 314 is sent to partial mixer 304. Both mixers 304 and 314 respectively generate final composite (fully-composited) streams (not expressly shown) and send them to their corresponding local endpoints.

A second scenario illustrated in FIG. 3 involves all three partial mixers 304, 314 and 324. It is assumed that the exchange of information between mixers 304 and 314 in the first scenario has occurred. In this second scenario, mixer 324 generates a composite stream including video set 309 and state information 310 of participant F, and sends it to mixer 314. Mixer 314 generates a composite stream including a video set 310 including video streams of participants D, E and A, as well as state information for each of these participants (308-1, 308-2 and 306-1), and sends it to mixer 314. In other words, mixer 314 sends mixer 324 a composite stream that includes its own local streams and metadata, as well as a local stream and metadata that it received from mixer 304. Mixer 314 can also send a composite signal to mixer 304 with the video stream and metadata it received/computed locally and the video stream and metadata it received from mixer 324.

Thus, based on the exchange of video streams and state information between the mixers in accordance with this collaborative, distributed mixing system and methodology, each partial mixer can generate composite streams to send to their corresponding endpoints.

Figure 4:
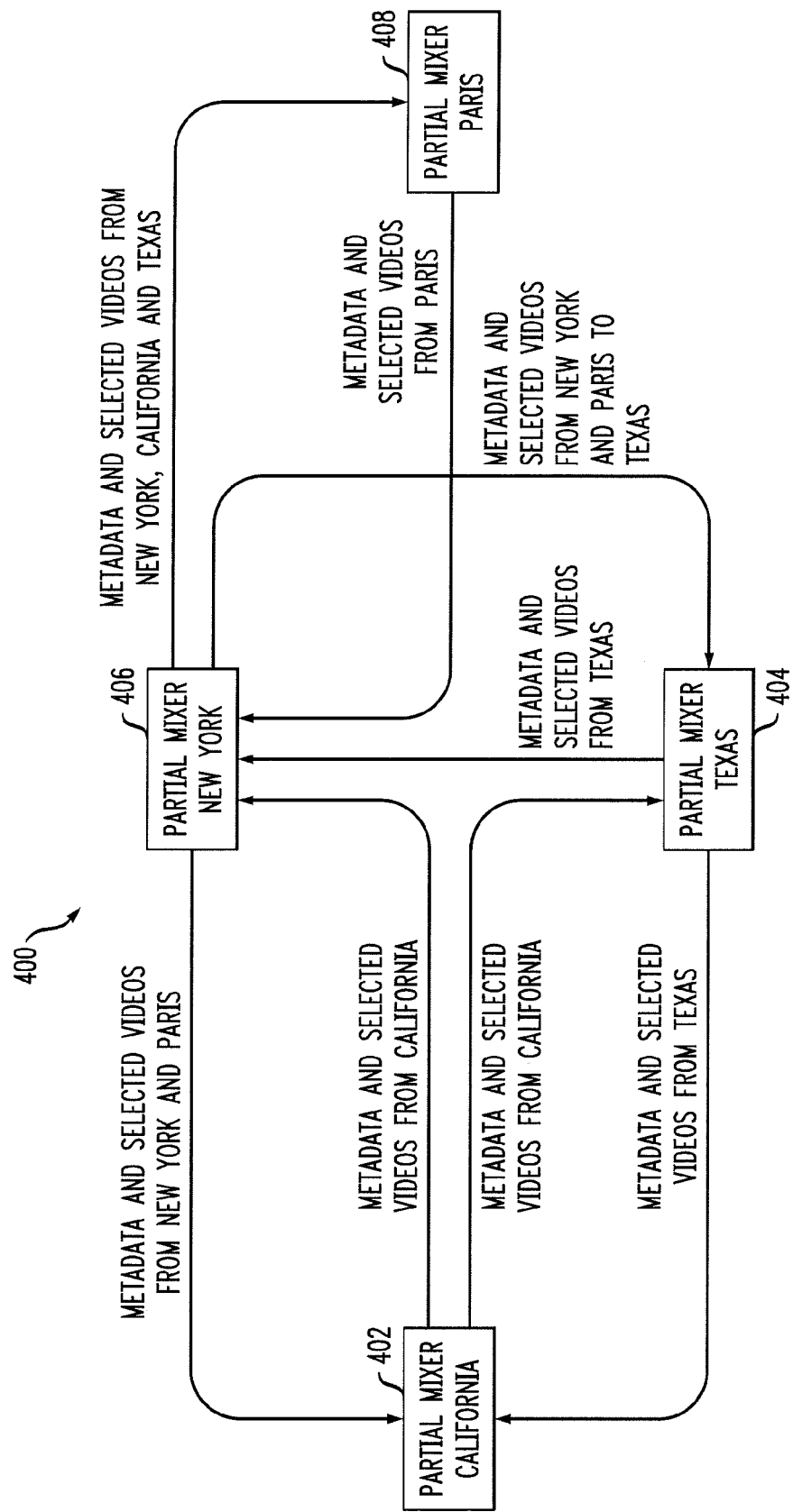
FIG. 4 illustrates a video conferencing application of a distributed video mixing system, according to another embodiment of the invention.

FIG. 4 illustrates a video conferencing application 400 of a distributed video mixing system, according to another embodiment of the invention. In this example of the distributed mixing methodologies of the invention, assume a hierarchical layering of geographically remote mixers including four partial mixers: a partial mixer 402 located in California, a partial mixer 404 located in Texas, a partial mixer 406 located in New York, and a partial mixer 408 located in Paris. It is assumed that each mixer has one or more local endpoints (not expressly shown) associated therewith that participate in a video conference.

In accordance with one or more embodiments described herein, each partial mixer is able to generate partially-composited video streams which include a selected partial set of video streams (from their local endpoints as well as from endpoints of other partial mixers that were received therefrom) and metadata (state information) for the full set of video streams. The exchanged streams may be similar to those described above in the context of FIG. 3.

As shown, mixer 406 receives the metadata and selected video from mixers 402, 404 and 408. Mixer 406 can then send metadata and selected videos from its local sources and mixer 408 to mixer 402, and metadata and selected, videos from its local sources and mixer 408 to mixer 404. Mixer 406 can also send metadata and selected videos from its local sources and mixers 402 and 404 to mixer 408. Mixers 402 and 404 can exchange metadata and selected videos.

Thus, mixer 406 can act as a bridge to lower latency relative to a four-way bridge. Advantageously, the stream output by mixer 406 to mixer 408 can include the global state and compositing from mixer 402, fully mixed and composited as if the streams from mixer 402 were local to mixer 406. Similarly, the output stream sent by mixer 406 to mixer 402 can include state and compositing from mixer 408. Bandwidth is saved by sending fewer composite images over the network (mixer 406 receives three, but some other locations only receive one).

Figure 5:
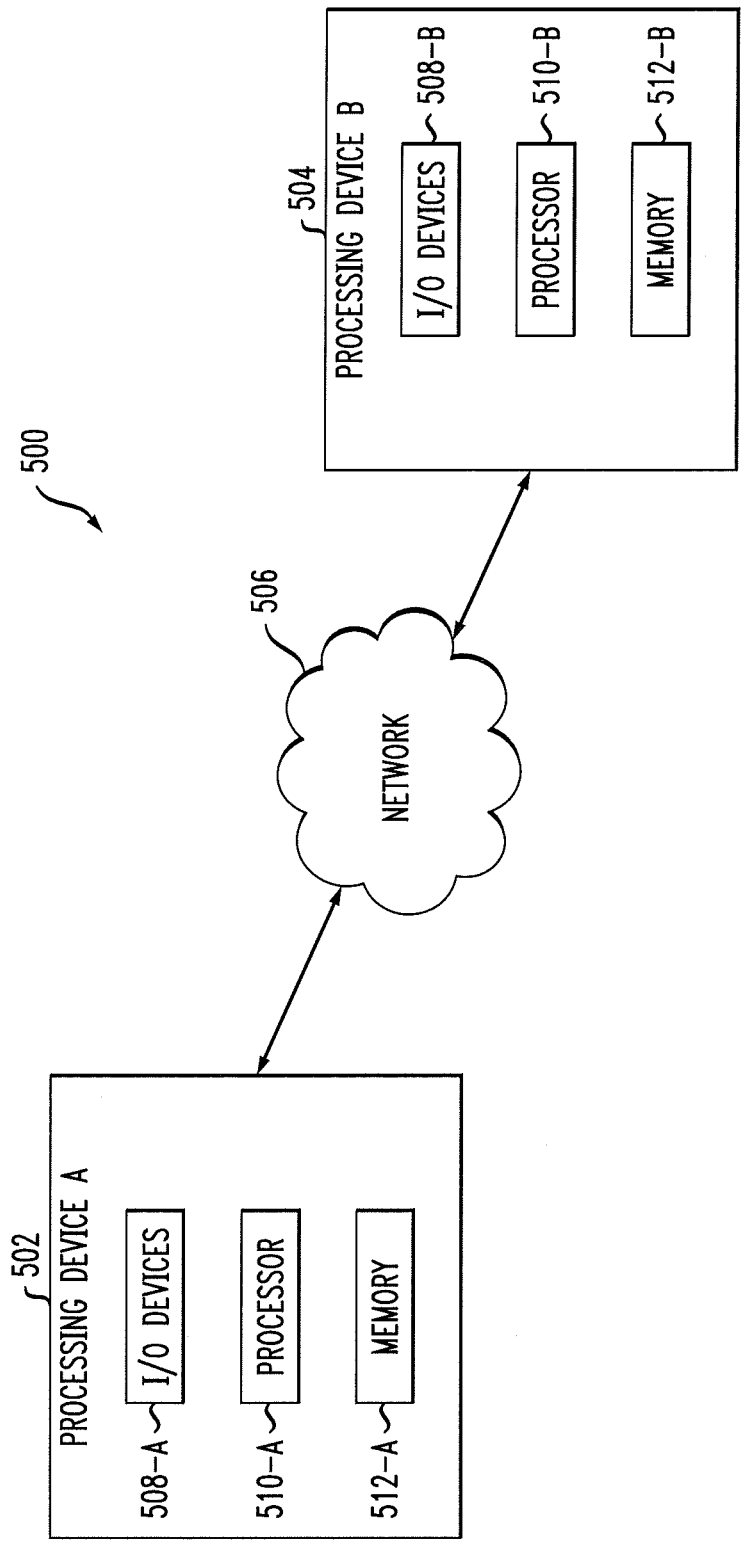
FIG. 5 illustrates a processing architecture of a video mixer and/or an endpoint, according to an embodiment of the invention.

FIG. 5 illustrates a processing architecture of a video mixer and/or an endpoint, according to an embodiment of the invention. While FIG. 5 shows detailed subcomponents for only two devices, it is to be understood that other devices can have the same configuration. Thus, in terms of the distributed mixing methodologies described above, the two devices shown in detail may be mixer 104 and mixer 108 shown in FIG. 1. However, the endpoints and other mixers shown in FIGS. 1-4 may be implemented with the same architecture as shown in a processing device of FIG. 5. For the sake of simplicity, all the processing devices that may participate in the methodologies of the invention are not shown in FIG. 5.

As shown, processing device A (e.g., partial mixer 104) designated 502 and processing device B (e.g., partial mixer 108) designated 504 are coupled via a network 506. The network may be any network across which the devices are able to communicate, for example, as in the embodiments described above, the network 506 could include a publicly-accessible wide area communication network such as a cellular communication network and/or the Internet and/or a private intranet. However, the invention is not limited to any particular type of network. Note that when the processing device is a mixer, it could be considered a server, and when the processing device is an endpoint it could be considered a client. Nonetheless, the methodologies of the present invention are not limited to cases where the devices are clients and/or servers, but instead are applicable to any processing (computing) devices.

As would be readily apparent to one of ordinary skill in the art, the processing devices may be implemented as programmed computers operating under control of computer program code. The computer program code would be stored in a computer readable storage medium (e.g., a memory) and the code would be executed by a processor of the computer. Given this disclosure of the invention, one skilled in the art could readily produce appropriate computer program code in order to implement the methodologies described herein.

As shown, device 502 comprises I/O devices 508-A, processor 510-A, and memory 512-A. Device 504 comprises I/O devices 508-B, processor 510-B, and memory 512-B. It should be understood that the term "processor" as used herein is intended to include one or more processing devices, including a central processing unit (CPU) or other processing circuitry, including but not limited to one or more video signal processors, one or more integrated circuits, and the like. Also, the term "memory" as used herein is intended to include memory associated with a video signal processor or CPU, such as RAM, ROM, a fixed memory device (e.g., hard drive), or a removable memory device (e.g., diskette or CDROM). Also, memory is one example of a computer readable storage medium. In addition, the term "I/O devices" as used herein is intended to include one or more input devices (e.g., keyboard, mouse) for inputting data to the processing unit, as well as one or more output devices (e.g., CRT display) for providing results associated with the processing unit.

Accordingly, software instructions or code for performing the methodologies of the invention, described herein, may be stored in one or more of the associated memory devices, e.g., ROM, fixed or removable memory, and, when ready to be utilized, loaded into RAM and executed by the CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
receiving, at a first mixing device, one or more local video streams from one or more sources local to the first mixing device;
generating, at the first mixing device, a first partially-composited video stream, wherein the first partially-composited video stream comprises: (i) a partial set of video elements of the one or more local video streams; and (ii) state information about the video elements of the one or more local video streams; and
sending, from the first mixing device, the first partially-composited video stream to at least a second mixing device remote from the first mixing device.

2. The method of claim 1, further comprising the first mixing device receiving a second partially-composited video stream from one of the second mixing device and a third mixing device remote from the first mixing device, the second partially-composited video stream comprising: (i) a partial set of video elements of one or more local video streams received from one or more sources local to the one of the second mixing device and the third mixing device; and (ii) state information about the video elements of the one or more local video streams.

3. The method of claim 2, further comprising the first mixing device using the first partially-composited video stream and the second partially-composited video stream to generate a fully-composited video stream.

4. The method of claim 3, further comprising the first mixing device sending the fully-composited video stream to one or more destinations.

5. The method of claim 4, wherein the one or more destinations are the one or more sources local to the first mixing device.

6. The method of claim 1, wherein the partial set of video elements of the one or more local video streams comprises a partial rendering of the one or more local video streams.

7. The method of claim 1, wherein the state information comprises data indicative of a presence of speech in a given video element.

8. The method of claim 1, wherein the state information comprises data indicative of an instance of face cropping in a given video element.

9. The method of claim 1, wherein the state information comprises data indicative of a contribution to an average sound level in a given video element.

10. The method of claim 1, wherein the first mixing device and the second mixing device are part of a video conferencing system.

11. An apparatus, comprising:
a memory; and
a processor coupled to the memory to form a first mixing device configured to:
receive one or more local video streams from one or more sources local to the first mixing device;
generate a first partially-composited video stream, wherein the first partially-composited video stream comprises: (i) a partial set of video elements of the one or more local video streams; and (ii) state information about the video elements of the one or more local video streams; and
send the first partially-composited video stream to at least a second mixing device remote from the first mixing device.

12. The apparatus of claim 11, wherein the first mixing device is further configured to receive a second partially-composited video stream from one of the second mixing device and a third mixing device remote from the first mixing device, the second partially-composited video stream comprising: (i) a partial set of video elements of one or more local video streams received from one or more sources local to the one of the second mixing device and the third mixing device; and (ii) state information about the video elements of the one or more local video streams.

13. The apparatus of claim 12, wherein the first mixing device is further configured to use the first partially-composited video stream and the second partially-composited video stream to generate a fully-composited video stream.

14. The apparatus of claim 13, wherein the first mixing device is further configured to send the fully-composited video stream to one or more destinations.

15. The apparatus of claim 14, wherein the one or more destinations are the one or more sources local to the first mixing device.

16. The apparatus of claim 11, wherein the partial set of video elements of the one or more local video streams comprises a partial rendering of the one or more local video streams.

17. The apparatus of claim 11, wherein the first mixing device and the second mixing device are part of a video conferencing system.

18. An article of manufacture, comprising:
a computer readable storage medium; and
one or more computer executable instructions stored on the computer readable storage medium that, when executed by a computer, perform steps of:
receiving, at a first mixing device, one or more local video streams from one or more sources local to the first mixing device;
generating, at the first mixing device, a first partially-composited video stream, wherein the first partially-composited video stream comprises: (i) a partial set of video elements of the one or more local video streams; and (ii) state information about the video elements of the one or more local video streams; and
sending, from the first mixing device, the first partially-composited video stream to at least a second mixing device remote from the first mixing device.

19. The method of claim 2, wherein at least one of the second mixing device and the third mixing device uses the state information received from the first mixing device in generating the second partially-composited video stream.

20. The apparatus of claim 12, wherein at least one of the second mixing device and the third mixing device uses the state information received from the first mixing device in generating the second partially-composited video stream.

\* \* \* \* \*